United States Patent [19]

Sakurai et al.

[11] 3,965,881
[45] June 29, 1976

[54] INTERNAL COMBUSTION ENGINE

[75] Inventors: Yoshitoshi Sakurai, Kawasaki; Takao Okura, Ooimachi; Miniru Tanaka, Chofu, all of Japan

[73] Assignee: Honda Giken Kogyo Kabushiki Kaisha, Tokyo, Japan

[22] Filed: July 12, 1974

[21] Appl. No.: 487,998

[30] Foreign Application Priority Data
July 18, 1973 Japan.............................. 48-80253

[52] U.S. Cl. .............................. 123/32 SP; 60/282; 123/32 ST; 123/122 AB; 123/122 AC
[51] Int. Cl.² .......................................... F02B 3/00
[58] Field of Search ...... 123/32 ST, 32 SP, 122 AC, 123/122 AB, 75 B, 127; 60/29, 282, 322, 323

[56] References Cited
UNITED STATES PATENTS

| | | | |
|---|---|---|---|
| 2,991,778 | 7/1961 | Kolbe | 123/122 AB |
| 3,659,564 | 5/1972 | Suzuki | 123/32 ST |
| 3,727,410 | 4/1973 | Scheitlin | 60/282 |
| 3,809,019 | 5/1974 | Stoltman | 123/122 AC |
| 3,827,416 | 8/1974 | Ader | 123/122 AC |
| 3,832,984 | 9/1974 | Taguchi | 123/32 SP |
| 3,853,097 | 12/1974 | Kume | 123/32 ST |

*Primary Examiner*—2
*Assistant Examiner*—Daniel J. O'Connor
*Attorney, Agent, or Firm*—Lyon & Lyon

[57] ABSTRACT

An internal-combustion spark-ignition V-8 piston engine has a main exhaust gas reaction chamber positioned between the two banks of cylinders. Each cylinder has a main combustion chamber and an auxiliary combustion chamber connected by a torch nozzle restriction. Valved intake passages supply lean mixture to the main combustion chambers and rich mixture to the auxiliary combustion chambers. A spark plug is associated with each auxiliary combustion chamber. Valved exhaust passages supply hot exhaust gases to auxiliary exhaust gas reaction chambers, each of which projects through an insulated wall of the main exhaust gas reaction chamber, and discharges into it. Each of the auxiliary reaction chambers is substantially larger in cross-section than each exhaust passage and each is substantially smaller in volume than the main reaction chamber and helps to minimize unwanted pollutants such as unburned hydrocarbons and carbon monoxide in the exhaust gases by maintaining the exhaust gases at relatively high temperature and for relatively long time periods before discharge into the atmosphere, and over a wide range of engine speeds and loads. A separate air pump is not required.

9 Claims, 2 Drawing Figures

INTERNAL COMBUSTION ENGINE

This invention relates to internal-combustion spark-ignition piston engines of the type having an auxiliary combustion chamber associated with each main combustion chamber and connected thereto through a torch nozzle restriction. A spark plug associated with each auxiliary combustion chamber ignites a relatively rich mixture therein to project a torch flame through the torch nozzle restriction into the main combustion chamber to burn the relatively lean mixture therein.

Conventional exhaust gas emission control devices have employed an air pump to supply secondary air to complete the combustion of HC and CO in an exhaust gas reaction chamber. The air pump is expensive, and the exhaust gas temperature is lowered by the secondary air with the result that there is a considerable time delay under startup conditions until the temperature within the reaction chamber reaches a sufficiently high value to insure active chemical reaction. If a smaller exhaust gas reaction chamber is provided in order to reduce such time delay, the reaction chamber has insufficient capacity to maintain the desired temperature and time when the engine is operating under heavy load conditions. This invention makes it possible to operate the engine with an overall lean air-fuel mixture so that hot excess air remaining in the exhaust gas can be used for exhaust gas reaction in two separate reaction chambers. One of the chambers is an auxiliary reaction chamber of small volume, capable of heating up quickly by a small amount of exhaust gas, and the other chamber is a main reaction chamber of large volume, capable of insuring reaction for a large amount of exhaust gas. In this way much of the unburned hydrocarbons are consumed, and much of the CO is converted to $CO_2$. The apparatus makes it possible to maintain the necessary time and temperature requirements over a wide range of engine operations between idling and full load. It is not necessary to supply additional atmospheric air for the reaction, and consequently no air pump is required. Moreover, this invention has been found particularly useful in connection with V-type engines having two banks of cylinders.

Other objects and advantages will appear hereinafter.

Figure 1:
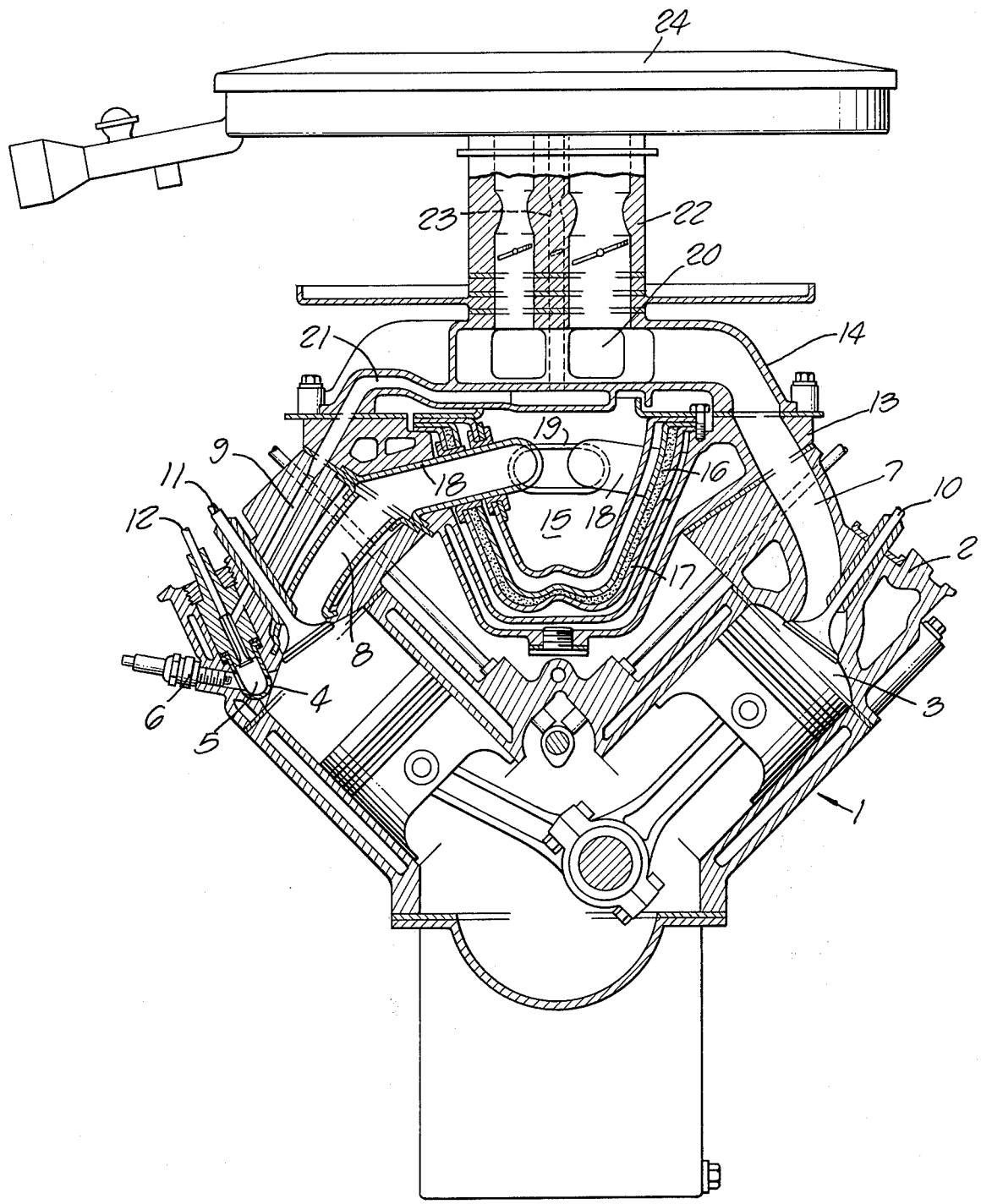
FIG. 1 is a sectional elevation showing a preferred embodiment of this invention.
Figure 2:
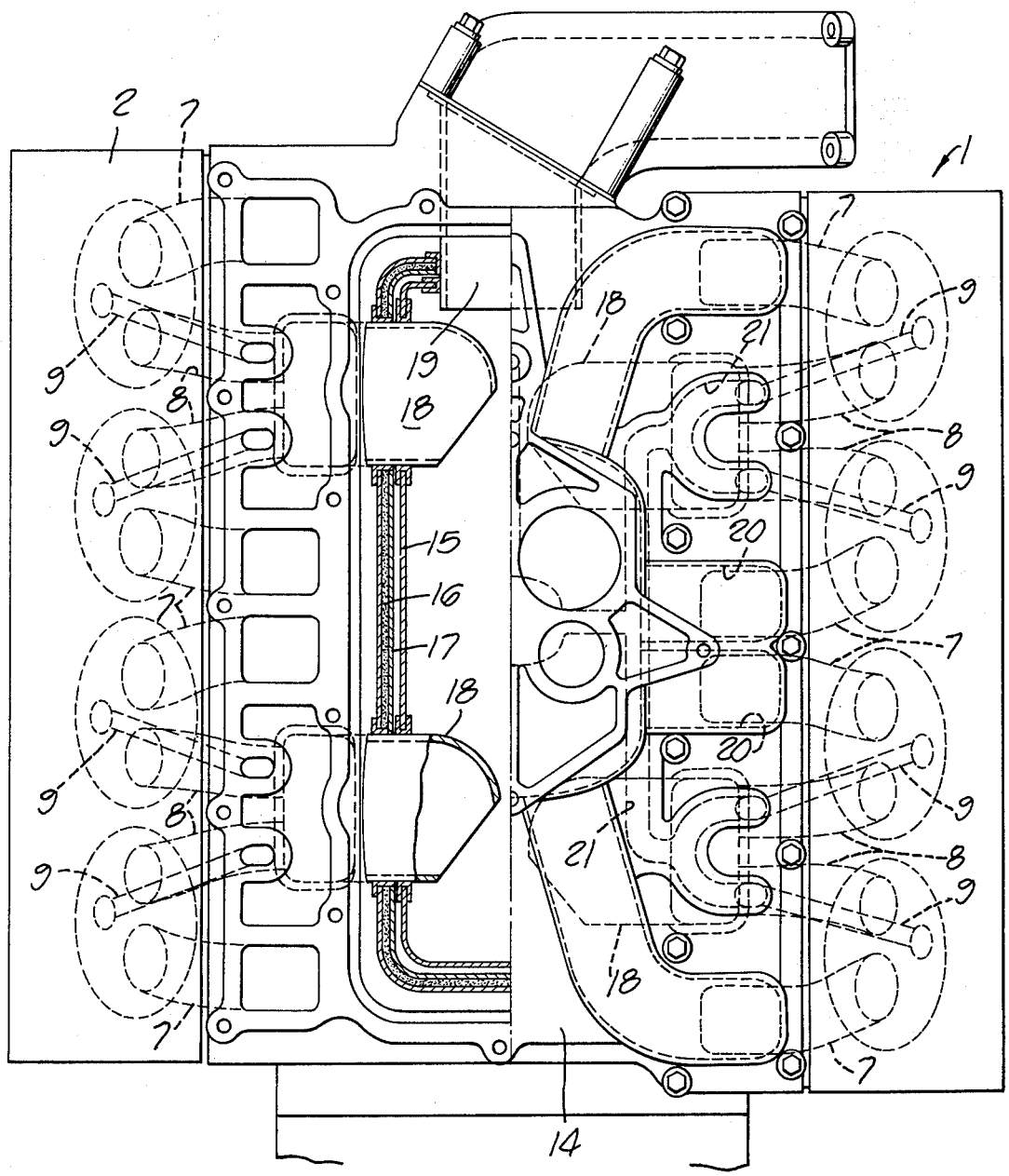
FIG. 2 is a plan view, partly broken away.

Referring to the drawings, the internal-combustion engine 1 which is disclosed has eight cylinders arranged in two banks in the shape of the letter V. Each cylinder has a main combustion chamber 3 and an auxiliary combustion chamber 5 connected through a torch nozzle restriction 4, with a spark plug 6 in the cylinder head 2 associated with each auxiliary combustion chamber 5. Each main combustion chamber 3 has a main intake passage 7 controlled by a main intake valve 10. Each auxiliary combustion chamber 5 has an auxiliary intake passage 9 controlled by an auxiliary intake valve 12. Each main combustion chamber has an exhaust valve 11 controlling an exhaust passage 8. The valves 10, 11 and 12 are operated by conventional valve actuating mechanism (not shown).

In accordance with this invention, a V-shaped space between the banks of cylinders is occupied by an exhaust gas reaction chamber body 13 which has an open top. This top opening is closed by the underside of the intake manifold 14. The reaction chamber body 13 incorporates a main exhaust gas reaction chamber 15 and heat insulating walls 17 housing the chamber 15. Spaces between the walls may be filled with ceramic or other heat insulation materials 16. Four auxiliary exhaust gas reaction chambers 18 project through the insulated side walls into the main reaction chamber 15. Each of these chambers 18 is substantially smaller in volume than the main reaction chamber 15. Each of the chambers 18 has a discharge opening directed toward the front of the main reaction chamber 15. An exhaust pipe extends from the rear of the main reaction chamber 15 and leads to a silencer, not shown. Each auxiliary reaction chamber 18 has walls formed of heat resistant material, such as stainless steel, and each is formed as a tubular member. The auxiliary reaction chambers 18 convey exhaust gases from exhaust ports of two cylinders adjacent to each other in the longitudinal direction of the engine 1, so that four chambers 18 are required for eight cylinders. The exhaust timing of adjacent cylinders is different, so that only one discharges into each chamber 18 at any one instant.

In the intake manifold 14, a main branch passage 20 and an auxiliary branch passage 21 are formed, and are connected to the main intake passage 7 and the auxiliary intake passage 9, respectively. A main carburetor 22 of known compound type is connected to the upper end opening of the main auxiliary branch passage 20. An auxiliary carburetor 23 of known single bore type is connected to the auxiliary branch passage 21. The main carburetor 22 is adjusted so as to be capable of producing a lean air-fuel mixture containing a large amount of excess air, and the auxiliary carburetor 23 is adjusted so as to be capable of producing a rich air-fuel mixture easy to be ignited electrically for the auxiliary combustion chambers 5.

In operation, atmospheric air is drawn through the air cleaner 24 and through the main carburetor 22 and auxiliary carburetor 23. A lean mixture produced in the main carburetor 22 is heated for vaporization in the main branch passage 20 in the intake manifold 14 and is distributed to each main intake passage 7 and into the main combustion chambers when the main intake valves 10 are open. The rich mixture produced in the auxiliary carburetor 23 is heated for vaporization in the auxiliary branch passage 21 and is distributed to each auxiliary intake passage 9 for induction into the respective auxiliary combustion chambers 5 when the auxiliary intake valves 12 are open. The rich mixture flows into and through the auxiliary combustion chambers 5 through the torch nozzle restrictions 4 into the main combustion chambers 3. On the subsequent compression stroke of the piston, the rich mixture, diluted to some extent by the lean mixture in the main chamber, is compressed back into the auxiliary combustion chamber 5 through the torch nozzle restriction 4. At the end of compression strokes the spark plug 6 ignites the mixture in the auxiliary chamber 5 to cause a torch flame to pass through the torch nozzle restriction 4 into the main combustion chamber 3 to burn the lean mixture therein. Thus the engine is operated by a mixture of extremely lean overall air-fuel ratio. Excess air in the lean mixture supplied to the main combustion chambers 3 is heated to the extent necessary.

During the subsequent exhaust stroke of each piston, exhaust gas is emitted through exhaust passages 8 first to an auxiliary reaction chamber 18 of small volume to heat the chamber 18 while the exhaust gas is expanding and slowing down in velocity. Particularly, since each pair of adjacent cylinders are different in exhaust timing from each other, exhaust gas is emitted alternately from their exhaust passages 8 into one common auxiliary reaction chamber 18 larger in cross-section, thus insuring that the streams of exhaust gas slow down to heat the chamber 18 quickly. Exhaust gas is then discharged into the main reaction chamber 15 which is of large volume to further expand, to heat the chamber 15 by the remaining heat and to further extend the time of relatively high temperature in the reaction chamber. The exhaust gas is finally discharged to the atmosphere through the exhaust pipe 19 and silencer (not shown). Therefore, the auxiliary reaction chamber 18 can be heated quickly even by a small amount of exhaust gas, even though the main reaction chamber 15 may be heated later in time when it is able to insure a reduction in velocity for a flow of a large amount of exhaust gas.

Thus when both reaction chambers 15 and 18 reach a chemical activation temperature, harmful components of the exhaust gas comingle well, while the exhaust gas passes through both reaction chambers at a low speed, and with excess air of high temperature to burn. This considerably reduces the amount of harmful components in the exhaust gases emitted to atmosphere.

As described above, this invention makes it possible not only to operate the engine with a lean mixture containing excess air, but also to utilize such excess air for exhaust gas reaction. By interposing in an exhaust passage, an auxiliary reaction chamber that is capable of heating up quickly by a small amount of exhaust gas, and a main reaction chamber which although being late in heating up, is capable of insuring reaction for a large amount of exhaust gas, this invention also makes possible to burn positively the exhaust gas again in either or both of reaction chambers with cooperation of highly heated excess air remaining in the exhaust gas, thus enabling harmful components in the exhaust gases to be eliminated irrespective of the quantity of exhaust gas. Also, no secondary air is required from atmosphere to be supplied to the exhaust passage, and thus there is no need for an air pump. Moreover, in an internal combustion engine of the multicylinder type, one common auxiliary reaction chamber 18 accommodates the exhaust gases from two adjacent cylinders that are different in exhaust timing, so that the auxiliary reaction chamber 18 not only insures a slow-down in velocity for the exhaust streams from the cylinders, but also is heated quickly by these exhaust streams to make the exhaust gases react more efficiently.

Having fully described our invention, it is to be understood that we are not to be limited to the details herein set forth but that our invention is of the full scope of the appended claims.

We claim:

1. In an internal-combustion spark-ignition piston engine having a plurality of cylinders each provided with a main combustion chamber and an auxiliary combustion chamber connected by a torch nozzle restriction, the improvement comprising in combination: first passage means including main valved intake passages for supplying a lean air-fuel mixture to each of said main combustion chambers, second passage means including auxiliary valved intake passages for supplying a rich air-fuel mixture to each of said auxiliary combustion chambers, a valved exhaust passage leading from each main combustion chamber, a main exhaust gas reaction chamber, a plurality of auxiliary exhaust gas reaction chambers connected to receive hot exhaust gases from the exhaust passages and each having walls extending into the interior of said main reaction chamber, said walls having a discharge opening communicating with said main reaction chamber, each of the auxiliary reaction chambers being substantially larger in cross-section than each said exhaust passage and being substantially smaller in volume than said main reaction chamber.

2. The combination set forth in claim 1 in which the main reaction chamber is positioned in heat exchange relationship with said second passage means for heating the rich mixture.

3. The combination set forth in claim 1 in which the main reaction chamber is positioned in heat exchange relationship with said first and second passage means for heating both the lean and rich mixtures.

4. The combination set forth in claim 1 in which the cylinders are arranged in two banks in a V shape with said main exhaust gas reaction chamber positioned between them.

5. The combination set forth in claim 1 in which each auxiliary reaction chamber is formed by a tubular member of heat resistant material projecting through an insulated wall of the main reaction chamber.

6. In an internal-combustion piston engine having a plurality of cylinders each provided with a main combustion chamber and an auxiliary combustion chamber connected by a torch nozzle restriction, and having a spark plug associated with each auxiliary combustion chamber, the improvement comprising in combination: first passage means including main valved intake passages for supplying a lean air-fuel mixture to each of said main combustion chambers, second passage means including auxiliary valved intake passages for supplying a rich air-fuel mixture to each of said auxiliary combustion chambers, a main exhaust gas reaction chamber positioned in heat exchange relationship with said passage means to heat both the lean mixture and the rich mixture, a valved exhaust passage leading from each main combustion chamber, a plurality of auxiliary exhaust gas reaction chambers connected to receive hot exhaust gases from a plurality of exhaust passages of different exhaust timing, the auxiliary reaction chambers each having walls extending into the interior of said main reaction chamber, said walls having a discharge opening communicating with said main exhaust gas reaction chamber, each of the auxiliary reaction chambers being substantially larger in cross-section than each said exhaust passage and being substantially smaller in volume than said main reaction chamber.

7. The combination set forth in claim 6 in which each auxiliary reaction chamber receives hot exhaust gases from two adjacent exhaust passages.

8. The combination set forth in claim 6 in which the discharge openings of said auxiliary reaction chambers are oriented toward one end of the main reaction chamber, and in which a discharge pipe communicates with an opposite end of said main reaction chamber.

9. In an internal-combustion spark-ignition piston engine having two banks of cylinders arranged in a V shape, said cylinders each being provided with a main combustion chamber and an auxiliary combustion chamber connected by a torch nozzle restriction, the improvement comprising in combination: first passage means including main valved intake passages for supplying a lean air-fuel mixture to each of said main combustion chambers, second passage means including auxiliary valved intake passages for supplying a rich air-fuel mixture to each of said auxiliary combustion chambers, a main exhaust gas reaction chamber positioned between the banks of cylinders in heat exchange relationship with said passage means to heat both the lean mixture and the rich mixture, a valved exhaust passage leading from each main combustion chamber, a plurality of auxiliary exhaust gas reaction chambers connected to receive hot exhaust gases from the exhaust passages, each auxiliary reaction chamber being formed by a tubular member of heat resistant material projecting through and into the interior of an insulated wall of the main reaction chamber, each of the auxiliary reaction chambers being substantially larger in cross-section than each said exhaust passage and being substantially smaller in volume than said main reaction chamber.

* * * * *